United States Patent Office 3,195,720
Patented July 20, 1965

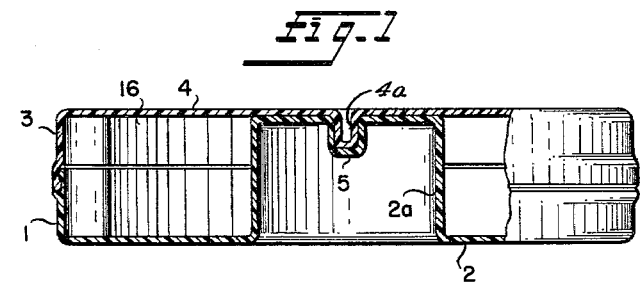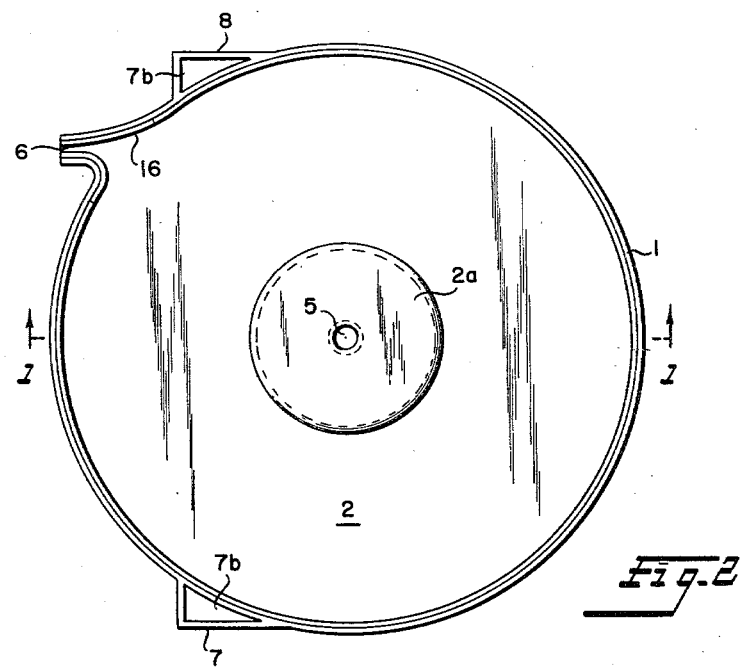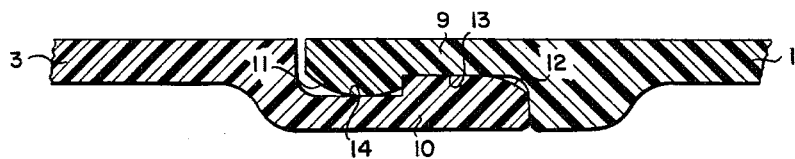

3,195,720
CASSETTE FOR PHOTOGRAPHIC FILM
OR PHOTOGRAPHIC PAPER
Jean Louis De Canniéré, Mortsel-Antwerp, Albert Emiel Smolderen, Wilrijk-Antwerp, and Lucien Paul Jacquemin, Mortsel-Antwerp, Belgium, assignors to Gevaert Photo-Producten N.V., Mortsel-Antwerp, Belgium, a Belgian company
Filed Aug. 28, 1961, Ser. No. 134,281
Claims priority, application Belgium, Oct. 14, 1960, 596,016
6 Claims. (Cl. 206—52)

The present invention relates to a cassette for photographic film or paper in rolls, and more particularly to an original wrapping or cassette, used for delivering such photographic film or paper to the customer.

It is already known to pack photographic film or photographic paper, wound up into rolls, in a cassette so that the end of such a film or paper is kept light-tight before being passed to the outside of the cassette through a slot in the side-wall. These cassettes mostly consist of a flat box with a light-tight closing lid. Very often such a cassette is provided with a core for locating the film or paper roll.

For example such cassettes are used by daylight for introducing the film or paper roll, wrapped into a light-tight paper or cardboard packing, into a copying device, an Auto-Photo-Automatic device, etc. For this purpose the film or paper roll is unwrapped in the dark room and a cassette is loaded with said film or paper roll. Next, this cassette may be brought into the copying device during daylight for further operation.

These cassettes are likewise used by the manufacturers as containers for their light-sensitive material. Consequently the customer is no longer obliged to have a dark room at his disposal for unwrapping the film or paper roll from its original wrapping to bring the light-sensitive material into the cassette. According to the above mentioned method said light-sensitive material can be placed directly into the copying device.

The practicing of such a method, however, involves the risk that the cassette containing the roll of light-sensitive material could be opened in a place which is not light-tight so that the light-sensitive material may become fogged. To guarantee that the cassette-lid has not been opened, the cassette is sealed by pasting a small band or envelope over both the edges of the box and the lid of the cassette. Practice shows, however, that such casettes are used more than once.

Indeed, when the original roll of light-sensitive material has been fully used, then the cassette seal is broken and new photographic material is put into the cassette. In case several cassettes are jointly used, errors can not be avoided in that a cassette is taken, which has already been opened at some wrong moment. Such an error will only be noticed after the entire quantity of the photographic material contained in a defined cassette has been exposed and developed.

The cassette according to this invention consists of two cylindrical halves each having a thickened rim, the edges of the rim being rounded off inwardly. An annular groove is provided in the inner face of the rim and spaced from the outer edge to form thus an annular ledge or tongue adapted to fit into the groove of the complementary half. It may thus be seen that after this cassette has been closed it cannot be opened again. Consequently this cassette cannot be treated in an erroneous way, as it cannot be re-opened without breaking it and therefore make it unsuitable for further use.

Preferably the cassette is made out of a synthetic material and thus can be very economicaly manufactured. Once the roll of photographic material, contained in the cassette, has been used up, the cassette is scrapped. Such a cassette is preferably used by the manufacturer of light-sensitive material for wrapping same, whereby a light-tight packing of the roll of film or paper is guaranteed.

Referring to the accompanying drawing the invention is hereinafter illustrated by way of example without limiting, however, the scope thereof.

FIG. 1 is an elevation of the cassette, partly in cross section along line 1—1 of FIG. 2;

FIG. 2 is a plan view of the lower half of the cassette according to FIG. 1;

FIG. 3 is a detailed view of the edge closure of the cassette;

Figure 4:
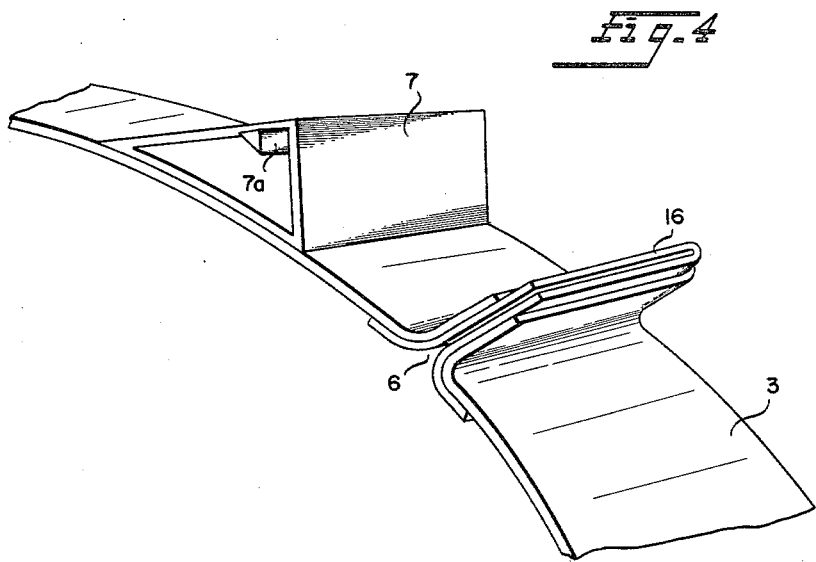
FIG. 4 is a perspective view of the upper cassette half showing a triangular projection fixed to the protruding part of this cassette half.
Figure 5:
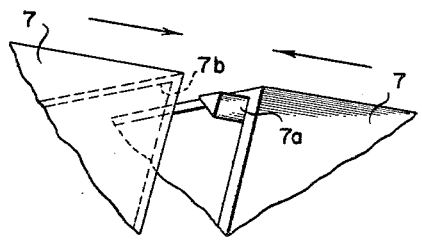
FIG. 5 is a perspective view of two corresponding protruding parts on the cassette halves, showing the triangular projection on one cassette half about to engage the triangular space in the other cassette half.

In FIG. 1 a cassette for photographic material wound in a roll is illustrated. The lower half 1 of this cassette is provided with a fixed core 2a in its bottom wall 2. To the upper half 3 of this cassette, a pin 4a is mounted centrally in its bottom wall 4 to fit into a corresponding recess or well 5 in the fixed core 2a whereby the exact positioning upon each other of both cassette halves is facilitated before closing. Two slots, viz. one in the lower cassette half (see numeral 6, FIG. 2) and a similar slot in the upper cassette half fit closely upon each other when the cassette has been closed. With an appropriate resilient covering 16 at the inside of these slots, the light-tightness of these slots is assured so that the damaging of the photographic material is avoided, while it is being pulled out.

Two protruding parts 7 and 8 provided on the outside of each cassette half permit the exact circumferential positioning of one cassette half in respect to the other. For this purpose each of the protruding parts 7 and 8 of the upper cassette half 3 is provided with a triangular projection 7a which fits into the triangular inner space 7b of the respective parts 7 and 8 of the lower cassette half 1. Thereby, any deformation of the close-fitting edges of the slots, intended for pulling the photographic material out of the cassette which is due to an inexact radial positioning of one cassette half in respect to the other, is avoided.

The light-tight edge closure, which prevents the opening of the cassette after it has been closed, is represented in FIG. 3 (turned by 90° in respect to FIG. 1).

Both cassette halves 1 and 3 are respectively provided with specially profiled edges 9 and 10. These edges show a rounded profile 11 and 12, respectively which is continued up to a stepped recess 13 and 14 respectively constituting an annular groove in each cassette half. It is clear that this edge closure can only be closed once. When pressing the cassette halves into closed position and sliding the rounded edges upon each other, the edge of the upper cassette half is momentarily displaced to the outside whereas the edge of the lower cassette half will be momentarily displaced to the inside. At the moment that both the edges are gripping each other, their original shape is restored whereby the mechanical and light-tight closure of the cassette is assured.

Since the invention is not limited to the foregoing example, any cassette composed of two parts, wherein one part is provided with a profiled edge closure which is close-fitting with the other part in such a way that, after closing, both parts cannot be loosened, complies with the present invention, and falls within its scope.

We claim:
1. A cassette containing a roll of film material com- prising two cylindrical halves permanently interlocked in a light-tight manner, each of said halves having:

(a) a bottom wall, (b) a resiliently deformable side wall, said side wall having a peripheral groove spaced from the outer edge thereof and providing an annular marginal tongue between said outer edge and said annular groove, said marginal tongue of one half snap engaging said annular groove of the other half in the locked position of said halves, (c) each of said halves being provided with a slot in its wall, said slots being aligned in said locked position so that film may be passed therethrough, said slots being further provided with light sealing material, (d) a first projection on one of said halves engaging a first recess on the other of said halves so as to axially align said halves, (e) and a second projection on one of said halves engaging a second recess on the other of said halves to prevent rotational movement of said halves.

2. A cassette according to claim 1 including a substantially triangular hollow part disposed on the outer face of each side wall, and an axially extending pin projecting from the top angle of one of said hollow parts and adapted to engage within the top angle of the other hollow part in the closed position to prevent rotation of said halves.

3. A cassette as defined in claim 1 wherein the outer edge of one of said side walls is rounded at the inner face to facilitate the inter-engagement of said halves.

4. A cassette as defined in claim 1 wherein said first projection and said first recess are located on the axis of said halves in the locked position.

5. A cassette as defined in claim 1 wherein said second projection and said second recess are located on radially protruding parts of said halves.

6. A cassette as defined in claim 5 where said radially protruding parts are hollow and of substantially triangular form, and said second projection being located in the top angle of said triangle.

References Cited by the Examiner

UNITED STATES PATENTS

| | | | |
|---|---|---|---|
| Re. 24,889 | 10/60 | Tupper | 220—60 |
| 1,686,204 | 10/28 | Covert | 242—72.1 |
| 1,829,103 | 10/31 | Merle | 206—52 |
| 2,019,672 | 11/35 | Goodhand | 206—52 |
| 2,051,206 | 8/36 | Fairbanks | 206—52 |
| 2,218,966 | 10/40 | Zapp | 206—52 |
| 2,302,850 | 11/42 | Funke | 206—52 |
| 2,481,095 | 9/49 | Essman | 206—52 |
| 2,688,820 | 9/54 | Geffroy | 206—52 |
| 2,706,065 | 4/55 | Stone | 220—4 |
| 2,719,679 | 10/55 | Nerwin | 242—71.1 |
| 2,751,760 | 6/56 | Williams | 220—60 |
| 2,798,597 | 7/57 | Thompson | 206—52 |
| 2,826,484 | 3/58 | Buehler | 220—4 |
| 2,858,955 | 11/58 | Kroenert | 220—4 |
| 2,878,848 | 3/59 | Coltman | 220—60 |
| 2,899,097 | 8/59 | Haskins | 220—60 |
| 2,982,450 | 5/61 | Whitton | 220—60 |
| 3,002,610 | 10/61 | Granger | 206—52 |
| 3,004,658 | 10/61 | Rehklau | 206—52 |
| 3,075,627 | 1/63 | Kuckhoff | 206—52 |

THERON E. CONDON, *Primary Examiner.*

EARLE J. DRUMMOND, FRANKLIN T. GARRETT, GEORGE O. RALSTON, *Examiners.*